W. G. ENGLE.
STANDING GRAIN THRESHER.
APPLICATION FILED SEPT. 23, 1913.

1,134,443.

Patented Apr. 6, 1915.
3 SHEETS—SHEET 2.

Witnesses.

Inventor:

W. G. ENGLE.
STANDING GRAIN THRESHER.
APPLICATION FILED SEPT. 23, 1913.
1,134,443.
Patented Apr. 6, 1915.
3 SHEETS—SHEET 3.
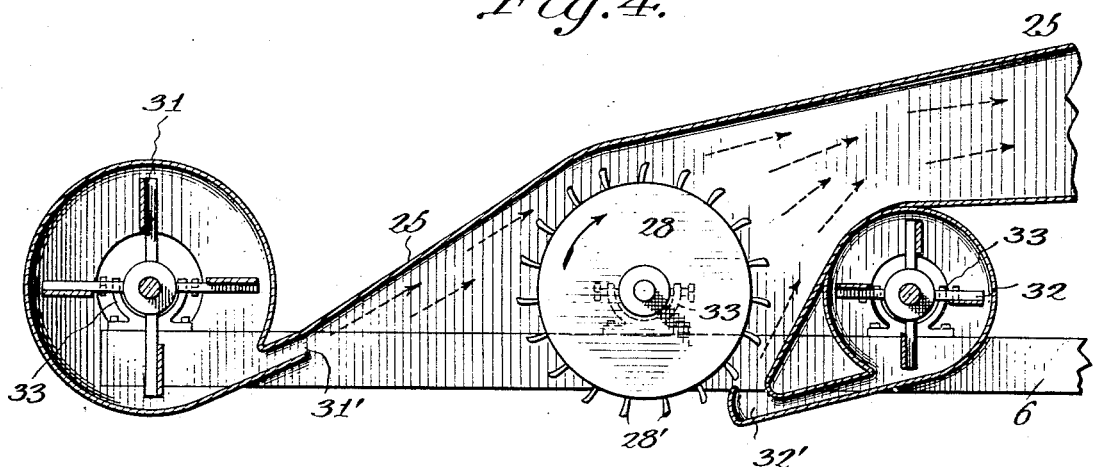
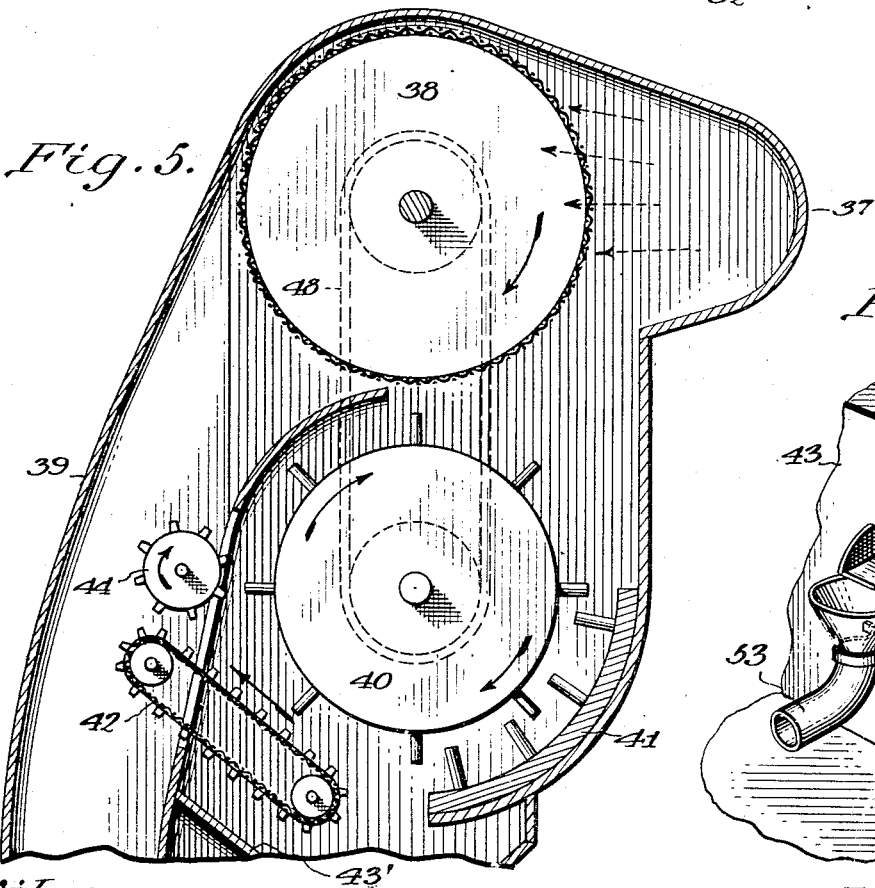
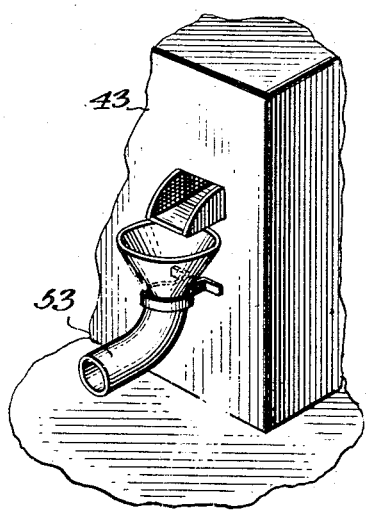
Witnesses:
Inventor:
William Garrison Engle
by his attorney,

UNITED STATES PATENT OFFICE.

WILLIAM GARRISON ENGLE, OF ENDERLIN, NORTH DAKOTA, ASSIGNOR OF ONE-TENTH TO J. M. BATES, OF LISBON, NORTH DAKOTA, AND ONE-TENTH TO K. O. SANDUM, OF MINNEAPOLIS, MINNESOTA.

STANDING-GRAIN THRESHER.

1,134,443.  Specification of Letters Patent.  Patented Apr. 6, 1915.

Application filed September 23, 1913. Serial No. 791,268.

*To all whom it may concern:*

Be it known that I, WILLIAM GARRISON ENGLE, a citizen of the United States of America, and a resident of Enderlin, in the State of North Dakota, have invented a new and useful Improvement in Standing-Grain Threshers, of which the following is a specification.

This invention relates to threshing harvesters, and especially to those machines designed to harvest and thresh wheat and like grain from the standing stalks, leaving the straw in the field, and handling only the grain with its chaff and those heads which are incidentally detached, as compared with "headers" which are designed to sever the heads from the stalks.

In a previous specification forming part of an application for United States Letters Patent, filed April 14, 1913, Serial No. 761,073, I have set forth an improvement in standing grain threshers to which the present improvement is additional. The improved threshing harvester set forth in said previous specification is primarily designed and adapted to be of large capacity and to be self-propelling.

The present invention consists in certain novel combinations of parts which may be and are intended to be embodied as a whole in an improved standing grain thresher hereinafter particularly described, which operates largely on the same principles as said self-propelling thresher, but is primarily designed and adapted to be drawn by two or more horses, mules or the like, so as to be suited to the requirements of smaller farmers, and is hereinafter referred to as "horse-drawn."

Other characteristics and objects of the invention will be set forth in the general description, which follows.

It is to be understood that some of the novel features of the horse-drawn machine may be embodied in "self-propelling" or motor-impelled standing grain threshers.

Three sheets of drawings accompany this specification as parts thereof.

Figure 1:
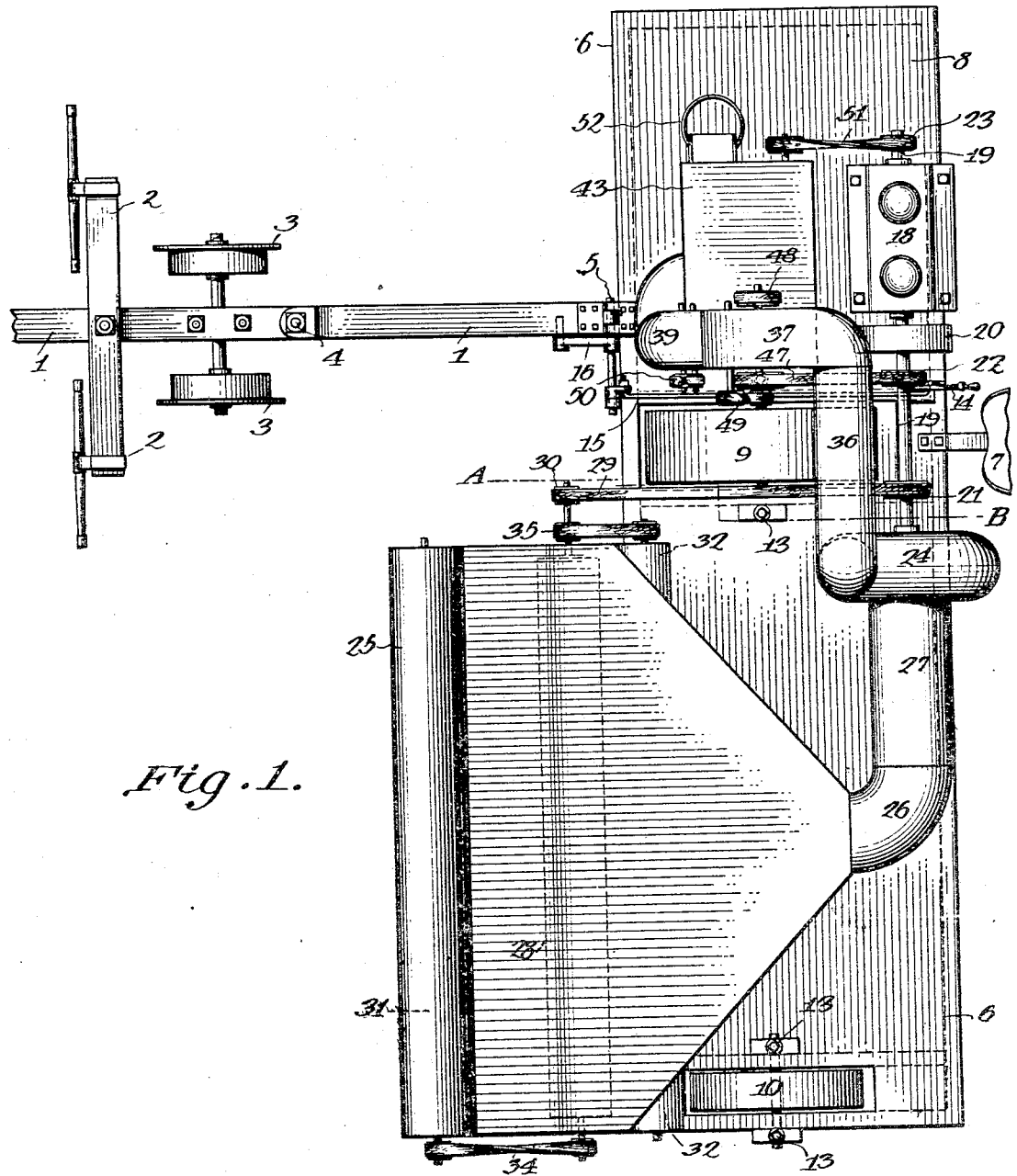
Figure 2:
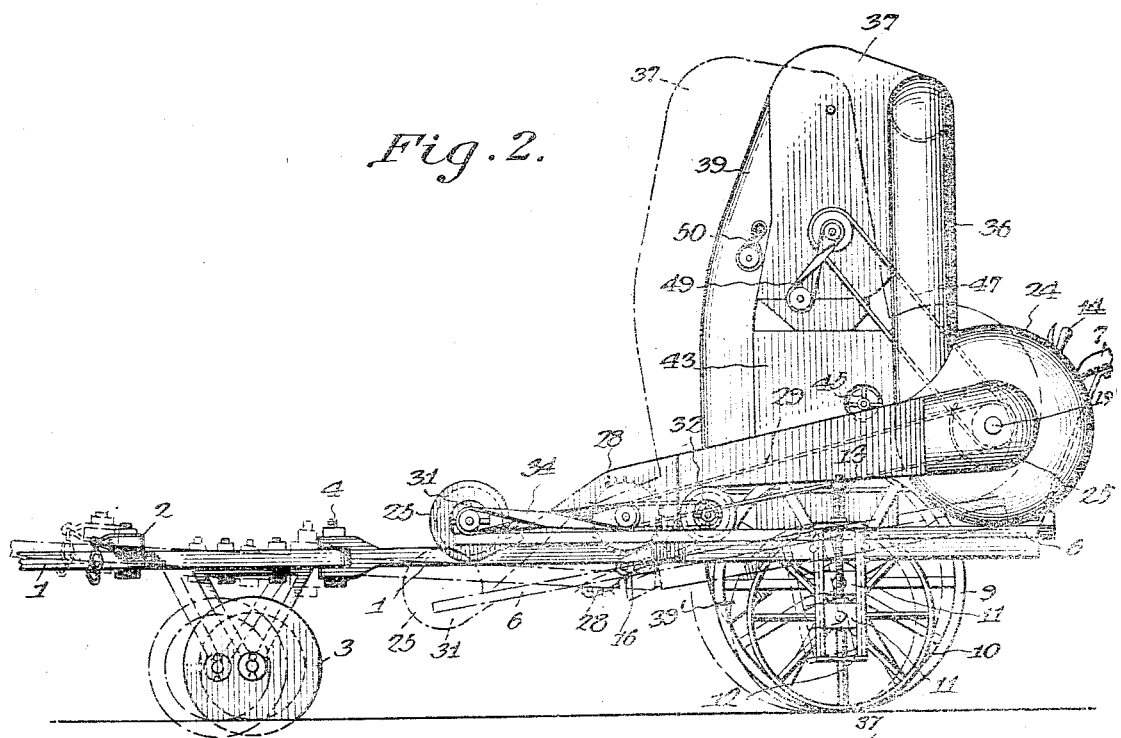
Figure 3:
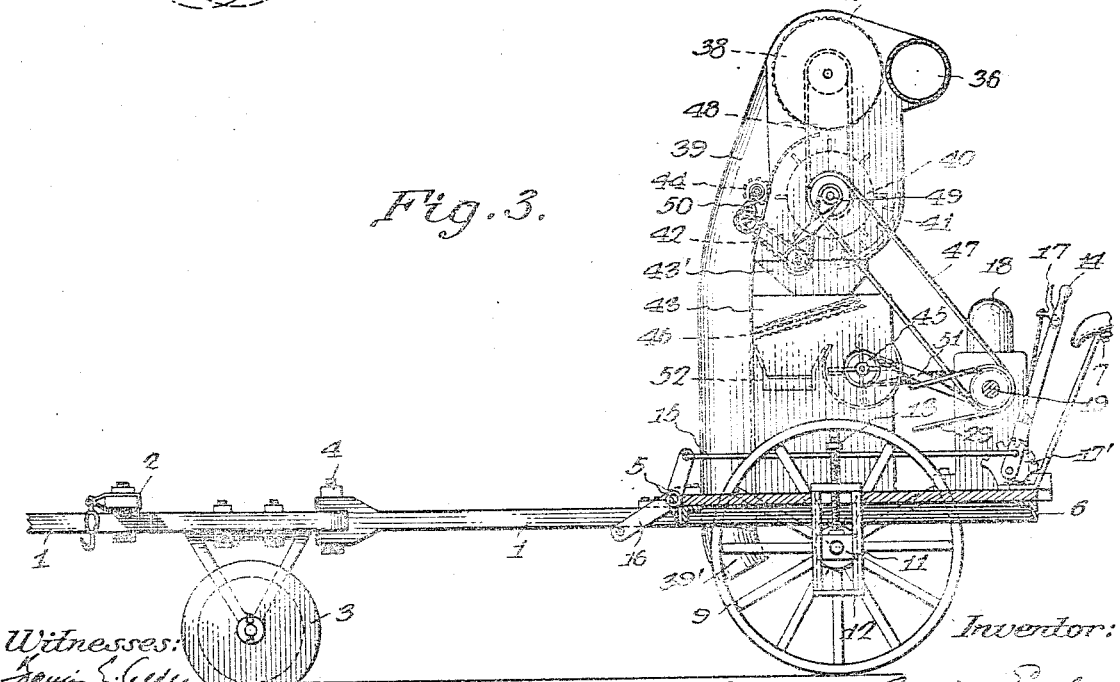

Figure 1 is a plan view of a horse-drawn standing-grain thresher, embodying the present invention; Fig. 2 is a side view of the same, illustrating by broken-line outlines an adjustment of the machine; Fig. 3 is a sectional side view with inclosed parts in dotted lines, the section being in the broken plane indicated by the line A—B, Fig. 1; Figs. 4 and 5 are fragmentary vertical longitudinal sections on a larger scale; and Fig. 6 is a fragmentary perspective view, illustrating a modification.

Like reference characters refer to like parts in all the figures.

A tongue and draft evener, represented respectively at 1 and 2, provide for attaching the horses; a pair of pilot wheels, 3, preferably flanged as shown so as to cut into the ground, support the tongue and steady the machine; a hinge joint, 4, in said tongue, having a vertical axis behind said wheels 3, facilitates making turns; and a hinge, 5, having a horizontal axis, connects said tongue with the main frame, 6; which latter is substantially horizontal, and provided with a driver's seat, 7, and a platform, 8, of any required extent for one or more other attendants. A large ground wheel, 9, located centrally with reference to the load in front of the driver's seat 7, and a smaller ground wheel, 10, at the extreme left of the driver, support the main frame 6 and its load; and their axles, in common, are mounted in boxes, 11, Figs. 2 and 3, vertically slidable in pedestals, 12, by means of screws, 13, to provide for raising or lowering said main frame for the general height of grain in a field about to be threshed. The bottoms of the two ground wheels 9 and 10, where they contact with the ground, are alined transversely of the machine, as indicated in Fig. 1, so that the machine as a whole may be tilted thereon. A hand lever, 14, which may be convenient to the driver's seat 7 as shown, suitable rod and rockshaft connections, 15, 16, between the same and the tongue 1, and suitable locking and unlocking means 17, 17', Fig. 3, provide for temporarily tilting the machine forward, as shown in broken lines in Fig. 2, or backward upon said alined bottoms of the wheels, to make minor adjustments as to the height of the grain as the harvesting operation progresses. A gasolene motor, 18, Figs. 1 and 3, of sufficient power to drive the threshing apparatus, is mounted therewith on said main frame 6, and provided with a horizontal power shaft 19, having a fly-wheel 20 and other customary appurtenances, and which carries driving pulleys 21, 22 and 23, Fig. 1. A main fan, 24, Figs. 1 and 2, of ample capacity is preferably and conveniently driven by said power shaft 19, direct.

A hood, 25, Figs. 1, 2 and 4, is rigidly supported by a forward extension of the main frame 6, to the left of the driver's seat 7 and main ground wheel 9; and a tubular elbow 26 and tube 27, Fig. 1, both of which may be rigid, connect the same with the central intake of the housing of said main fan 24.

A toothed stripping cylinder 28, Figs. 1, 2 and 4, of suitable length, and preferably of the construction set forth in said previous specification, is mounted within said hood 25, parallel with the front of the machine, and is rotated continuously through an open belt and pulley, 29, 30, from said driving pulley 21, in the direction represented by the arrow thereon in Fig. 4, so that its spoon-shaped teeth 28' travel upward at the exposed front of the cylinder.

A blower, 31, Figs. 1, 2 and 4, ahead of the stripping cylinder 28, and a blower, 32, behind said stripping cylinder, are mounted within said hood 25; that is to say their respective housings are incorporated therewith, as best shown in Fig. 4, which see. The outlet 31' of said blower 31 is directed rearward and upward toward the space at the top of the stripping cylinder 28; the outlet 32' of said blower 32 is directed upward beneath the teeth of the stripping cylinder at its back, and the blast of said blower 32 unites with that of said blower 31 directly behind the stripping cylinder, within the hood 25, as indicated in Fig. 4. The weight of said forward or front extension of the main frame 6 and its load, especially the stripping cylinder 28 and blower 31, is supported in part by said pilot wheels 3 beneath the tongue 1.

The shafts of the stripping cylinder 28 and blowers 31, 32, in common, are mounted in adjustable bearings, 33, one of which is clearly shown in dotted lines in Fig. 4; a pair of horizontal screws at each bearing insuring the correction of any lack of parallelism, and the tightening of their driving belts. The rotor of the blower 31 is driven by a crossed belt and pulleys, 34, Figs. 1 and 2 from the shaft of said cylinder 28; and the rotor of the blower 32 is driven by an open belt and pulleys 35, Fig. 1, from said shaft of the stripping cylinder.

The spoon-shaped teeth, 28', Fig. 4, of the stripping cylinder 28, protrude from a solid periphery as in said previous specification, and their concave faces, directed upward at the front of the cylinder, strike the grain heads from beneath, and catching the threshed grains as well as the detached heads and chaff, throw them over the cylinder, into the interior of the hood 25, in which operation the blast from the blower 31 obviously assists materially to prevent loss of any detached grains which may escape from the teeth.

The blast from the blower 32, coming up right behind the stripping cylinder 28, prevents any grain from going down between the cylinder and the adjoining edge of the bottom of the hood 25, and also tends to counteract any tendency of the rapidly rotating cylinder to produce an adverse current of air at its bottom.

The united blast of the two blowers, 31, 32, coincides with the draft of the main fan 24; and a highly effective current of air within the hood 25 is thus insured. This current of air carries along the grain, grain heads and chaff, hereinafter referred to as grain and chaff, and delivers the same in the first place into the interior of the housing of the main fan 24.

From the housing of the main fan 24, the grain and chaff are thrown tangentially by centrifugal force aided by the current of air; and the latter continues their movement upward and horizontally through an air trunk, 36, Figs. 1–3, into the interior of a housing, 37, and against the peripheral screen of an air-separating cylinder or rotary screen, 38, Figs. 3 and 5, through which the air passes into an escape tube, 39; the grain and chaff dropping therefrom upon the cylinder of a toothed supplemental threshing cylinder and concave, 40, 41, as in said previous specification.

A suitably located and proportioned endless apron riddle, 42, Figs. 3 and 5, extending from within the housing 37 into said escape tube 39, carries directly into the latter most of the chaff from immediately below the threshing cylinder 40, so as to keep the chaff from clogging a subjacent fanning mill, 43, Figs. 1–3, into which the grain with the remainder of the chaff passes for separation as in said previous specification. The apron of the riddle 42 is of wire screen, through which any grains that may fall upon the riddle drop into the hopper, 43', Fig. 5, of the fanning mill.

A rotary beater, 44, Figs. 3 and 5, in suitable juxtaposition with reference to said threshing cylinder 40, keeps the chaff and grain from following this cylinder, and throws the same back upon the riddle 42. Most of the chaff goes over the end of the riddle into the escape tube 39, and the grain falls through into the fanning mill 43 as aforesaid.

The fanning mill 43, Figs. 1–3, may, for the purposes of the present invention, be of any known or improved construction. Substantially the same arrangement of rotary fan 45 and screens 46 is shown in Fig. 3 as in said previous specification.

Motion is transmitted to a pulley on the shaft of said threshing cylinder 40 from the driving pulley 22 on the power shaft 19 through an open belt 47, Figs. 1–3; from another pulley on said cylinder shaft, through an open belt 48, Figs. 3 and 5, to a pulley on the shaft of said rotary screen 38; from another pulley on said shaft of said cylinder 40, through a crossed belt, 49, Figs. 1–3, to the driving shaft of said riddle 42; and from the driven shaft of said riddle 42 to a pulley on the shaft of said beater 44, through a crossed belt 50, Figs. 1–3. From the driving pulley 23 on said power shaft 20, motion is transmitted through a crossed belt, 51, Figs. 1 and 3, to a pulley on the shaft of said fan 45 of the fanning mill 43.

The grain is discharged from the fanning mill 43 through a bagger, 52, Figs. 1 and 3, of a suitable form above the platform 8, or, alternatively, through a spout, 53, Fig. 6, adapted to be extended so as to deliver the grain into a wagon driven alongside of the thresher. The chaff discharged by the riddle 42, with that discharged by the fanning mill 43, escapes with the exhaust air from all the fans through the lower end 39', Figs. 2 and 3, of the escape tube 39, beneath the machine.

The adjusting screws 13 may be worked by ratchet wrenches, as indicated by their squared upper ends, or may be provided with hand cranks; the appurtenances of the hand lever 14 may be of known or improved construction and arrangement; sprocket wheels and chains may obviously be substituted for most of the pulleys, and any or all of the open belts; the motor may alternatively be an alcohol motor, an electric motor or of any other suitable type; and other like modifications will suggest themselves to those skilled in the art.

All patentable parts, combinations of parts and improvements hereinbefore described which are also set forth in said previous specification forming part of my said application filed April 14, 1913 (Serial No. 761,073) are hereby disclaimed in favor of said previous specification, and to that extent form no part of the present invention.

Having thus described said improvement, I claim as my invention and desire to patent under this specification:

1. A standing grain thresher having, in combination with a motor carried upon the wheeled main frame of the machine, and means for moving the machine over the ground, a fan, a hood and tubular connections, in communication with the intake of said fan and extending thereto from the front of the machine, a toothed stripping cylinder rotating within said hood parallel with its front and spaced from its top, the teeth of said cylinder traveling upward at its front, a blower in advance of said cylinder having its outlet directed rearward and upward toward the space at the top of said cylinder, and connections through which said cylinder and the rotors of said fan and blower are driven by said motor.

2. A standing grain thresher having, in combination with a motor carried upon the wheeled main frame of the machine, and means for moving the machine over the ground, a fan, a hood and tubular connections in communication with the intake of said fan and extending thereto from the front of the machine, a toothed stripping cylinder rotating within said hood parallel with its front and spaced from its top, the teeth of said cylinder traveling upward at its front having its outlet directed rearward and upward toward the space at the top of said cylinder, a blower close behind said cylinder having its outlet directed upward beneath the descending teeth of said cylinder, and connections through which said cylinder and the rotors of said fan and blower are driven by said motor.

3. A standing grain thresher having, in combination with a motor carried upon the wheels main frame of the machine, and means for moving the machine over the ground, a fan, a hood and tubular connections in communication with the intake of said fan and extending thereto from the front of the machine, a toothed stripping cylinder rotating within said hood parallel with its front and spaced from its top and from the front edge of the bottom of the hood, the teeth of said cylinder traveling upward at its front, blowers at the front of said hood ahead of and behind said cylinder, the outlet of the front blower being directed rearward and upward toward the space at the top of said cylinder and its blast serving to assist the cylinder teeth in throwing the grain and detached heads over said cylinder to be caught by the air current within said hood, and the outlet of the rear blower being directed upward beneath the descending teeth of said cylinder and its blast serving to prevent grain from going down behind the cylinder and to counteract any tendency of the cylinder to produce an adverse current of air at its bottom, and connections through which said cylinder and the rotors of said fan and blowers are driven by said motor.

4. The combination, in a standing grain thresher, of an ingathering hood, a suction fan in communication with said hood and adapted to produce an air current therethrough, a toothed stripping cylinder rotating within said hood parallel with its front and spaced from its top, the teeth of said cylinder traveling upward at its front, a blower in advance of said cylinder having its outlet directed rearward and upward toward the space at the top of said cylinder and its blast serving to assist the cylinder teeth in throwing the grain and detached heads over said cylinder to be caught by the air current within said hood, and means for driving said cylinder and the rotors of said fan and blower.

5. The combination, in a standing grain thresher, of an ingathering hood, means for producing an air current therethrough, a stripping cylinder rotating within said hood parallel with its front and spaced from its top and from the front edge of the bottom of said hood, the teeth of said cylinder traveling upward at its front, a blower behind said cylinder having its outlet directed upward beneath the descending cylinder teeth and its blast serving to prevent grain from going down behind the cylinder and to counteract any tendency of the cylinder to produce an adverse current of air at its bottom, and means for driving said air-current producing means said cylinder and the rotor of said blower.

6. The combination, in a standing grain thresher, of a rotary fan, an ingathering hood in communication with the intake of said fan, a toothed stripping cylinder rotating within said hood parallel with its front and spaced from its top and from the front edge of the bottom of said hood, the teeth of said cylinder traveling upward at its front, a blower behind said cylinder having its outlet directed upward beneath the descending teeth of said cylinder, and means for driving said cylinder and the rotors of said fan and blower.

7. The combination, in a standing grain thresher, of an ingathering hood, means for producing an air current therethrough, a toothed stripping cylinder rotating within said hood parallel with its front and spaced from its top and from the front edge of the bottom of said hood, the teeth of said cylinder traveling upward at its front, a blower at the front of said hood having its outlet directed rearward and upward toward the space at the top of said cylinder, and its blast serving to assist the cylinder teeth in throwing the grain and detached heads over said cylinder to be caught by the air current within said hood, a blower close behind said cylinder having its outlet directed upward beneath the descending teeth of said cylinder and its blast serving to prevent grain from going down behind the cylinder and to counteract any tendency of the cylinder to produce an adverse current of air at its bottom, and means for driving said air-current producing means said cylinder and the rotors of said blowers.

8. The combination, in a standing grain thresher, of a rotary fan, an ingathering hood in communication with the intake of said fan, a toothed stripping cylinder rotating within said hood parallel with its front and spaced from its top and from the front edge of the bottom of said hood, the teeth of said cylinder traveling upward at its front, a blower at the front of said hood having its outlet directed rearward and upward toward the space at the top of said cylinder, and its blast serving to assist the cylinder teeth in throwing the grain and detached heads over said cylinder to be caught by the air current within said hood, a blower close behind said cylinder having its outlet directed upward beneath the descending teeth of said cylinder and its blast serving to prevent grain from going down behind the cylinder and to counteract any tendency of the cylinder to produce an adverse current of air at its bottom, and means for driving said cylinder and the rotors of said fan and blowers.

9. The combination, in a standing grain thresher, of a rotary fan, an ingathering hood in communication with the intake of said fan, a toothed stripping cylinder rotating within said hood parallel with its front and spaced from its top, the teeth of said cylinder traveling upward at its front, a blower in advance of said cylinder having its outlet directed rearward and upward toward the space at the top of said cylinder and its blast serving to assist the cylinder teeth in throwing the grain and detached heads over said cylinder to be caught by the air current within said hood, a main frame common to all said devices, a motor mounted on said frame, and means for driving said cylinder and the rotors of said fan and blower from said motor.

10. The combination, in a standing grain thresher, of a rotary fan, an ingathering hood in communication with the intake of said fan, a toothed stripping cylinder rotating within said hood parallel with its front and spaced from its top and from the front edge of the bottom of said hood, the teeth of said cylinder traveling upward at its front, a blower behind said cylinder having its outlet directed upward beneath the descending teeth of said cylinder, a main frame common to said devices, a motor mounted on said frame, and means for driving said cylinder and the rotors of said fan and blower from said motor.

11. The combination, in a standing grain thresher, of a rotary fan, an ingathering hood in communication with the intake of said fan, a toothed stripping cylinder rotating within said hood parallel with its front and spaced from its top, the teeth of said cylinder traveling upward at its front, a blower in advance of said cylinder having its outlet directed rearward and upward toward the space at the top of said cylinder and its blast serving to assist the cylinder teeth in throwing the grain and detached heads over said cylinder to be caught by the air current within said hood, a main frame common to all said devices, a motor mounted on said frame and having a shaft which carries the rotor of said fan, and means for driving said cylinder and the rotor of said blower from said shaft.

12. The combination, in a standing grain thresher, of a rotary fan, an ingathering hood in communication with the intake of said fan, a toothed stripping cylinder rotating within said hood parallel with its front and spaced from its top and from the front edge of the bottom of said hood, the teeth of said cylinder traveling upward at its front, a blower behind said cylinder having its outlet directed upward beneath the descending teeth of said cylinder, a main frame common to all said devices, a motor mounted on said frame and having a shaft which carries the rotor of said fan; and means for driving said cylinder and the rotor of said blower from said shaft.

13. The combination, in a standing grain thresher, of a rotary fan, an ingathering hood in communication with the intake of said fan, a toothed stripping cylinder rotating within said hood parallel with its front and spaced from its top and from the front edge of the bottom of said hood, the teeth of said cylinder traveling upward at its front, a blower at the front of said hood having its outlet directed rearward and upward toward the space at the top of said cylinder, and its blast serving to assist the cylinder teeth in throwing the grain and detached heads over said cylinder to be caught by the air current within said hood, a blower close behind said cylinder having its outlet directed upward beneath the descending teeth of said cylinder and its blast serving to prevent grain from going down behind the cylinder and to counteract any tendency of the cylinder to produce an adverse current of air at its bottom, a main frame common to all said devices, a motor mounted on said frame and having a shaft which carries the rotor of said fan, and belt gearing transmitting motion from said shaft to said cylinder and the rotors of said blowers respectively.

14. A standing grain thresher having, in combination with a motor carried upon the wheeled main frame of the machine, and means for moving the machine over the ground, a fan, a hood at the front of the machine, tubular connections in communication with said hood and with the intake of said fan, means for stripping the grain heads and throwing the grain and chaff into said hood to be caught and carried forward by the suction of said fan, an air trunk receiving the discharge of said fan, an air separating screen against which said trunk discharges, a supplemental threshing cylinder and concave receiving the grain and chaff from said screen, an escape tube through which the blast of air separated by said screen is conducted beneath the machine, anti-clogging means in juxtaposition to said supplemental cylinder to carry off some of the chaff discharged thereby into said escape tube, and a subjacent fanning mill adapted to complete the separation of the grain.

15. A standing grain thresher having, in combination with a motor carried upon the wheeled main frame of the machine, and means for moving the machine over the ground, a fan, a hood at the front of the machine, tubular connections in communication with said hood and with the intake of said fan, means for stripping the grain heads and throwing the grain and chaff into said hood to be caught and carried forward by the suction of said fan, an air trunk receiving the discharge of said fan, an air separating screen against which said trunk discharges, a supplemental threshing cylinder and concave receiving the grain and chaff from said screen, an escape tube through which the blast of air separated by said screen is conducted beneath the machine, a riddle supported in juxtaposition to said supplemental cylinder and adapted to carry off some of the chaff discharged thereby directly into said escape tube, and a subjacent fanning mill adapted to complete the separation of the grain.

16. A standing grain thresher, having, in combination with a motor carried upon the wheeled main frame of the machine, and means for moving the machine over the ground, a fan, a hood at the front of the machine, tubular connections in communication with said hood and with the intake of said fan, means for stripping the grain heads and throwing the grain and chaff into said hood to be caught and carried forward by the suction of said fan, an air trunk receiving the discharge of said fan, an air separating screen against which said trunk discharges, a supplemental threshing cylinder and concave receiving the grain and chaff from said screen, an escape tube through which the blast of air separated by said screen is conducted beneath the machine, an endless screen riddle arranged to receive a portion of the discharge of said supplemental cylinder and to discharge the chaff direct into said escape tube, and a fanning mill arranged to receive grain and chaff from said supplemental cylinder and the grain from said riddle.

17. A standing grain thresher having, in combination with a motor carried upon the wheeled main frame of the machine, and means for moving the machine over the ground, a fan, a hood at the front of the machine, tubular connections in communication with said hood and with the intake of said fan, means for stripping the grain heads and throwing the grain and chaff into said hood to be caught and carried forward by the suction of said fan, an air trunk receiving the discharge of said fan, an air separating screen against which said trunk discharges, a supplemental threshing cylinder and concave receiving the grain and chaff from said screen, an escape tube through which the blast of air separated by said screen is conducted beneath the machine, a beater in juxtaposition to said supplemental cylinder adapted to keep the chaff and grain from following said supplemental cylinder around and a subjacent fanning mill through which all the grain is passed.

18. A standing grain thresher having, in combination with a motor carried upon the wheeled main frame of the machine, and means for moving the machine over the ground, a fan, a hood at the front of the machine, tubular connections in communication with said hood and with the intake of said fan, means for stripping the grain heads and throwing the grain and chaff into said hood to be caught and carried forward by the suction of said fan, an air trunk receiving the discharge of said fan, an air separating screen against which said trunk discharges, a supplemental threshing cylinder and concave receiving the grain and chaff from said screen, an escape tube through which the blast of air separated by said screen is conducted beneath the machine, a beater in juxtaposition to said supplemental cylinder adapted to keep the chaff and grain from following said supplemental cylinder around, a riddle supported in juxtaposition to said supplemental cylinder and beater and adapted to carry off some of the chaff discharged by said supplemental cylinder including the chaff thrown back by said beater, and a subjacent fanning mill through which all the grain is passed.

19. A standing grain thresher having, in combination with a motor carried upon the wheeled main frame of the machine, and means for moving the machine over the ground, a fan, a hood at the front of the machine, tubular connections in communication with said hood and with the intake of said fan, means for stripping the grain heads and throwing the grain and chaff into said hood to be caught and carried forward by the suction of said fan, an air trunk receiving the discharge of said fan, an air separating screen against which said trunk discharges, a supplemental threshing cylinder and concave receiving the grain and chaff from said screen, an escape tube through which the blast of air separated by said screen is conducted beneath the machine, a beater in juxtaposition to said supplemental cylinder adapted to keep the chaff and grain from following said supplemental cylinder around, a riddle supported in juxtaposition to said supplemental cylinder and beater and adapted to carry off some of the chaff discharged by said supplemental cylinder including the chaff thrown back by said beater, and a subjacent fanning mill through which all the grain is passed; said main frame having a platform adjoining said fanning mill and said fanning mill being provided with a delivery device above said platform through which the grain is discharged.

WILLIAM GARRISON ENGLE.

Witnesses:
S. VEORHIES,
B. N. ENGLE.